United States Patent
Fukawatase

(10) Patent No.: US 11,161,471 B2
(45) Date of Patent: Nov. 2, 2021

(54) VEHICLE OCCUPANT PROTECTION STRUCTURE

(71) Applicant: TOYOTA JIDOSHA KABUSHIKI KAISHA, Toyota (JP)

(72) Inventor: Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 16/529,923

(22) Filed: Aug. 2, 2019

(65) Prior Publication Data

US 2020/0094764 A1 Mar. 26, 2020

(30) Foreign Application Priority Data

Sep. 26, 2018 (JP) .............................. JP2018-179980

(51) Int. Cl.
| | | |
|---|---|---|
| *B60R 21/02* | (2006.01) | |
| *B60N 3/00* | (2006.01) | |
| *B60R 21/20* | (2011.01) | |
| *B60R 21/18* | (2006.01) | |
| *B60R 22/34* | (2006.01) | |
| *B60N 2/005* | (2006.01) | |
| *B60N 2/14* | (2006.01) | |
| *B60N 2/07* | (2006.01) | |
| *B60N 2/64* | (2006.01) | |
| *G05D 1/02* | (2020.01) | |
| *B60R 21/00* | (2006.01) | |

(52) U.S. Cl.
CPC ............ *B60R 21/026* (2013.01); *B60N 2/005* (2013.01); *B60N 2/07* (2013.01); *B60N 2/14* (2013.01); *B60N 2/64* (2013.01); *B60N 3/001* (2013.01); *B60R 21/18* (2013.01); *B60R 21/20* (2013.01); *B60R 22/34* (2013.01); *B60R 2021/0037* (2013.01); *G05D 1/021* (2013.01)

(58) Field of Classification Search
CPC ....... B60R 21/026; B60R 21/20; B60R 21/18; B60R 21/34; B60R 2021/0037; B60R 3/001; B60N 3/001; B60N 2/005; B60N 2/14; B60N 2/07; B60N 2/64; B60N 2/05; G05D 1/021
See application file for complete search history.

(56) References Cited

U.S. PATENT DOCUMENTS

| | | | | |
|---|---|---|---|---|
| 6,182,778 B1 * | 2/2001 | Henshaw | ............ | B66F 9/07545 180/89.12 |
| 7,093,900 B1 * | 8/2006 | Schon | .................... | A47C 9/002 297/259.4 |

(Continued)

FOREIGN PATENT DOCUMENTS

| | | |
|---|---|---|
| CN | 107284392 A | 10/2017 |
| CN | 107914777 A | 4/2018 |

(Continued)

*Primary Examiner* — James A English
*Assistant Examiner* — Kurtis Nielson
(74) *Attorney, Agent, or Firm* — Oliff PLC

(57) ABSTRACT

A vehicle occupant protection structure includes a seat body including a seatback configured to support a back of an occupant, and a shell section including a portion configured to face a side of the occupant whose back is supported by the seatback and the portion configured to restrict movement of the occupant in a seat width direction in a case of a vehicle collision.

10 Claims, 5 Drawing Sheets

(56) References Cited

U.S. PATENT DOCUMENTS

| | | | |
|---|---|---|---|
| 9,744,932 B1* | 8/2017 | Faruque | B60R 21/16 |
| 10,173,558 B1* | 1/2019 | Kondrad | B60N 2/4228 |
| 10,279,770 B2* | 5/2019 | Faruque | B60R 21/2342 |
| 2014/0300088 A1* | 10/2014 | Fukawatase | B60R 21/08 |
| | | | 280/729 |
| 2017/0096085 A1 | 4/2017 | Akaike et al. | |
| 2017/0225788 A1* | 8/2017 | Humbert | B64D 11/06205 |
| 2017/0247006 A1* | 8/2017 | Rao | B60R 21/18 |
| 2017/0259772 A1* | 9/2017 | Farooq | B60R 21/0136 |
| 2018/0099705 A1* | 4/2018 | Faruque | B62D 31/00 |
| 2018/0265136 A1* | 9/2018 | Baccouche | B60N 2/06 |
| 2018/0354397 A1* | 12/2018 | Leek | A47B 3/00 |
| 2018/0356897 A1* | 12/2018 | Hoggarth | B60K 35/00 |
| 2019/0071046 A1* | 3/2019 | Dry | B60R 21/207 |
| 2019/0092264 A1* | 3/2019 | Spahn | B60R 21/231 |
| 2019/0111877 A1* | 4/2019 | Line | B60R 21/233 |
| 2019/0126786 A1* | 5/2019 | Dry | B60N 2/14 |
| 2019/0303729 A1* | 10/2019 | Gramenos | G06K 9/00832 |
| 2020/0047641 A1* | 2/2020 | D'Eramo | A47C 3/04 |
| 2020/0047643 A1* | 2/2020 | Ellis | A61G 3/0808 |
| 2020/0189418 A1* | 6/2020 | Sailer | B60N 2/062 |

FOREIGN PATENT DOCUMENTS

| | | |
|---|---|---|
| JP | 2017-065599 A | 4/2017 |
| JP | 2017-226370 A | 12/2017 |
| JP | 2018-114783 A | 7/2018 |

\* cited by examiner

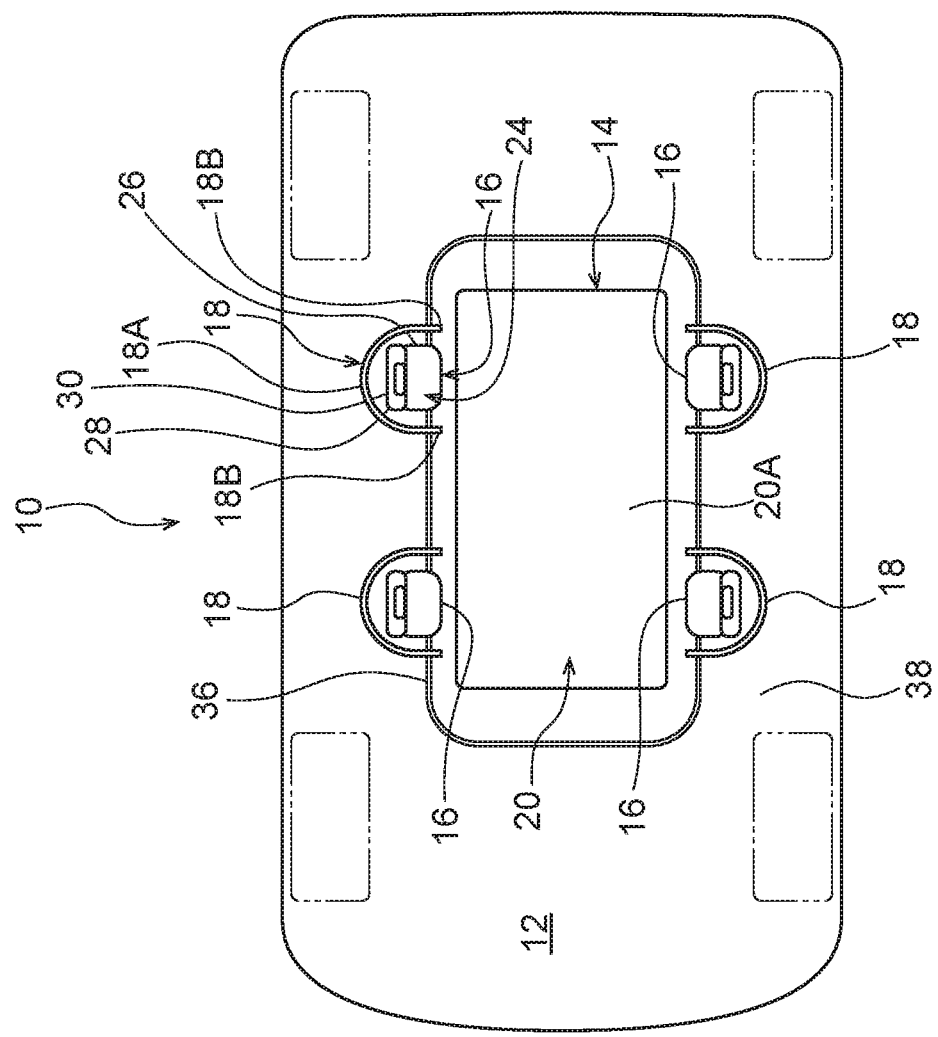
FIG.1
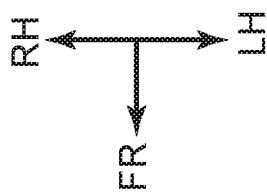

VEHICLE OCCUPANT PROTECTION STRUCTURE

CROSS-REFERENCE TO RELATED APPLICATION

This application claims priority under 35 USC 119 from Japanese Patent Application No. 2018-179980 filed Sep. 26, 2018, the disclosure of which is incorporated by reference herein in its entirety.

BACKGROUND

Technical Field

The present disclosure relates to a vehicle occupant protection structure.

Related Art

Japanese Patent Application Laid-Open (JP-A) No. 2017-226370 discloses a vehicle provided with seats and a desk in an onboard space of self-driving vehicle. In the vehicle disclosed in this document, plural seats are provided around the desk. Occupants sitting in the plural seats are able to communicate with each other through conversation or the like.

SUMMARY

In a vehicle such as a self-driving vehicle in which vehicle seats are provided in different orientations to each other, it is conceivable that an occupant might come into contact with members peripheral to the vehicle seat in a collision. The vehicle disclosed in the above document does not consider such an eventuality.

In consideration of the above circumstances, the present disclosure obtains a vehicle occupant protection structure capable of suppressing an occupant from coming into contact with members peripheral to a vehicle seat.

A vehicle occupant protection structure of a first aspect of the present disclosure includes a seat body that includes a seatback that is configured to support a back of an occupant, and a shell section that includes a portion that is configured to face a side of the occupant whose back is supported by the seatback and the portion is configured to restrict movement of the occupant in a seat width direction in a case of a vehicle collision.

According to the vehicle occupant protection structure of the first aspect, when the occupant moves in the seat width direction in a case of a vehicle collision in a state in which a back of the occupant is supported by the seatback, the body of the occupant is restrained by the shell section. This thereby enables the occupant to be suppressed from coming into contact with members peripheral to the vehicle seat.

A vehicle occupant protection structure of a second aspect of the present disclosure includes a table, a seat body, and an airbag. The table is provided in a vehicle cabin and includes a work surface enabling an occupant to perform a task or includes a placement face on which luggage can be placed. The seat body is provided peripherally to the table and includes at least a seatback configured to support a back of an occupant. The airbag is provided between the occupant whose back is supported by the seatback and the table, the airbag is configured to inflate and deploy in a case of a vehicle collision.

According to the vehicle occupant protection structure of the second aspect, the occupant is able to perform a task on the work surface of the table provided in the vehicle cabin. Alternatively, luggage can be placed on the placement face of the table provided in the vehicle cabin.

In a case of a vehicle collision in a state in which a back of the occupant is supported by the seatback, the airbag inflates and deploys between the occupant and the table. This thereby enables the occupant to be suppressed from coming into contact with the table disposed peripherally to the vehicle seat.

A vehicle occupant protection structure of a third aspect of the present disclosure is the configuration of the second aspect, further includes a seatbelt device that includes a webbing configured to be worn by the occupant whose back is supported by the seatback. The airbag is provided at the webbing.

According to the vehicle occupant protection structure of the third aspect, the airbag is provided at the webbing. The airbag is thus interposed between the webbing and the table when the airbag inflates and deploys in a case of a vehicle collision. Moreover, in the present aspect, the occupant can be suppressed from coming into contact with the table even if airbags do not inflate and deploy around the entire periphery of the table.

A vehicle occupant protection structure of a fourth aspect of the present disclosure is the configuration of the third aspect, in which the webbing is pulled out from a webbing take-up device so as to be worn by the occupant and the webbing is pulled into the webbing take-up device in a case of a vehicle collision such that a body of the occupant whose back is supported by the seatback is restrained by the webbing.

According to the vehicle occupant protection structure of the fourth aspect, in a case of a vehicle collision the webbing is pulled into the webbing take-up device and the body of the occupant whose back is supported by the seatback is restrained by the webbing. This thereby enables the occupant to be more effectively suppressed from coming into contact with the table.

A vehicle occupant protection structure of a fifth aspect of the present disclosure is the configuration of any one of the first aspect to the fourth aspect, in which a height of the seatback from a floor of a vehicle cabin is set such that a back of the occupant is supported by the seatback when in a standing posture or in an almost-standing posture.

According to the vehicle occupant protection structure of the fifth aspect, in a case of a vehicle collision in a state in which a back of an occupant in a standing posture or in an almost-standing posture is supported by the seatback, the occupant can be suppressed from coming into contact with members peripheral to the vehicle seat by the shell section and the airbag.

A vehicle occupant protection structure of a sixth aspect of the present disclosure is the configuration of any one of the first aspect to the fifth aspect, in which the seat body is supported by the vehicle so as to be rotatable about an axial direction running in a vehicle vertical direction.

According to the vehicle occupant protection structure of the sixth aspect, the seat body is supported by the vehicle so as to be rotatable about an axial direction running in the vehicle vertical direction. The seat body can thus adopt orientations in various directions with respect to the vehicle front-rear direction and the vehicle width direction. Even in such cases, the occupant can be suppressed from coming into contact with members peripheral to the vehicle seat by the shell section and the airbag.

A vehicle occupant protection structure of a seventh aspect of the present disclosure is the vehicle occupant protection structure of any one of the first aspect to the sixth aspect, in which a seat rail that is formed in a loop shape as viewed from a vehicle upper side is provided at a floor of a vehicle cabin, and the seat body is supported by a seat support member that is configured to move along the seat rail.

According to the vehicle occupant protection structure of the seventh aspect, the seat body can be moved along the loop shape as viewed from the vehicle upper side by moving the seat support member along the seat rail.

The vehicle occupant protection structure according to the present disclosure exhibits the excellent advantageous effect of enabling an occupant to be suppressed from coming into contact with members peripheral to the vehicle seat.

BRIEF DESCRIPTION OF THE DRAWINGS

Exemplary embodiments of the present disclosure will be described in detail based on the following figures, wherein:

FIG. 1 is a plan view schematically illustrating a vehicle cabin of a vehicle of a first exemplary embodiment of the present disclosure;

DETAILED DESCRIPTION

First Exemplary Embodiment

Figure 2:
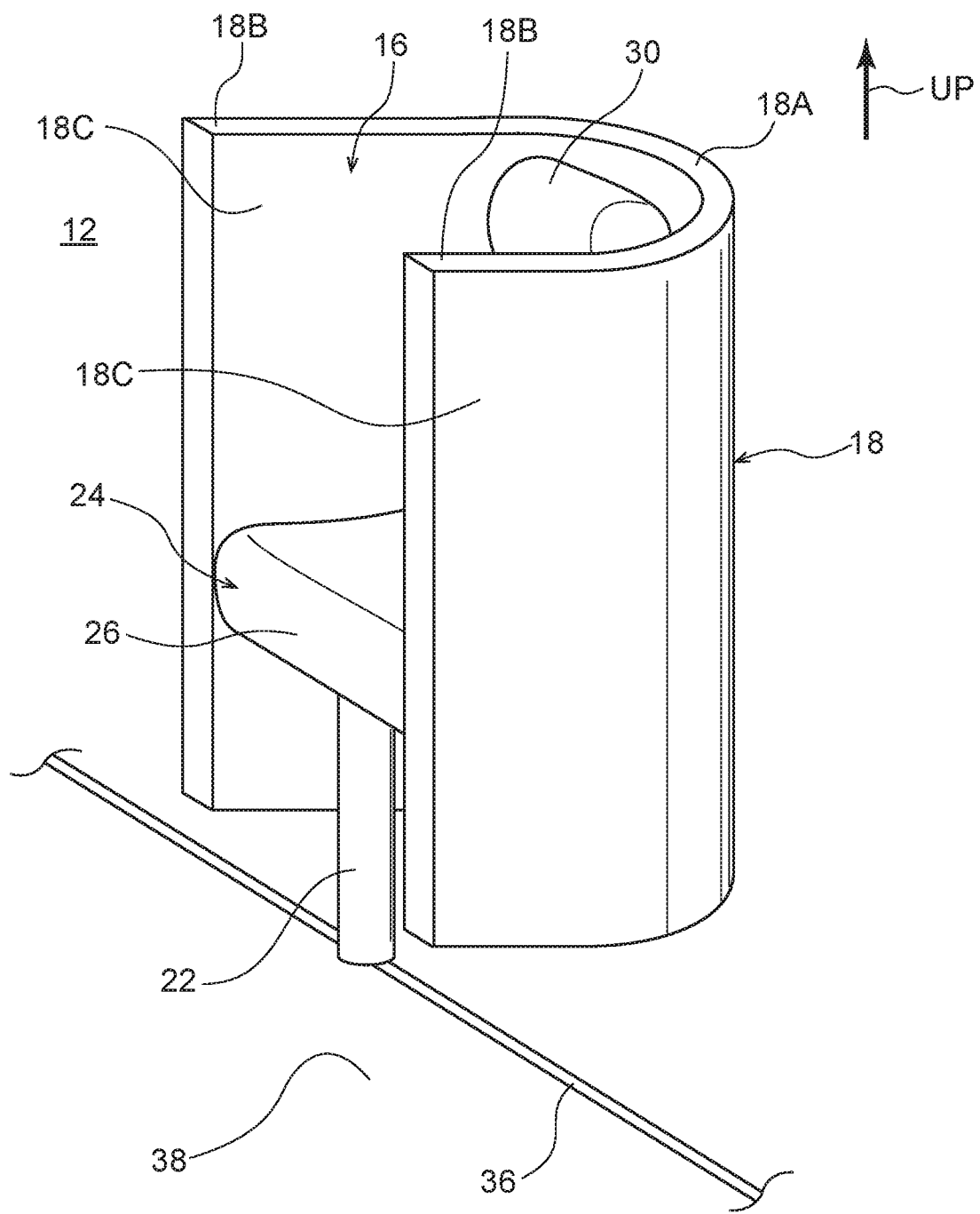
FIG. 2 is a perspective view illustrating a vehicle seat and a protective shell of the first exemplary embodiment.
Figure 3:
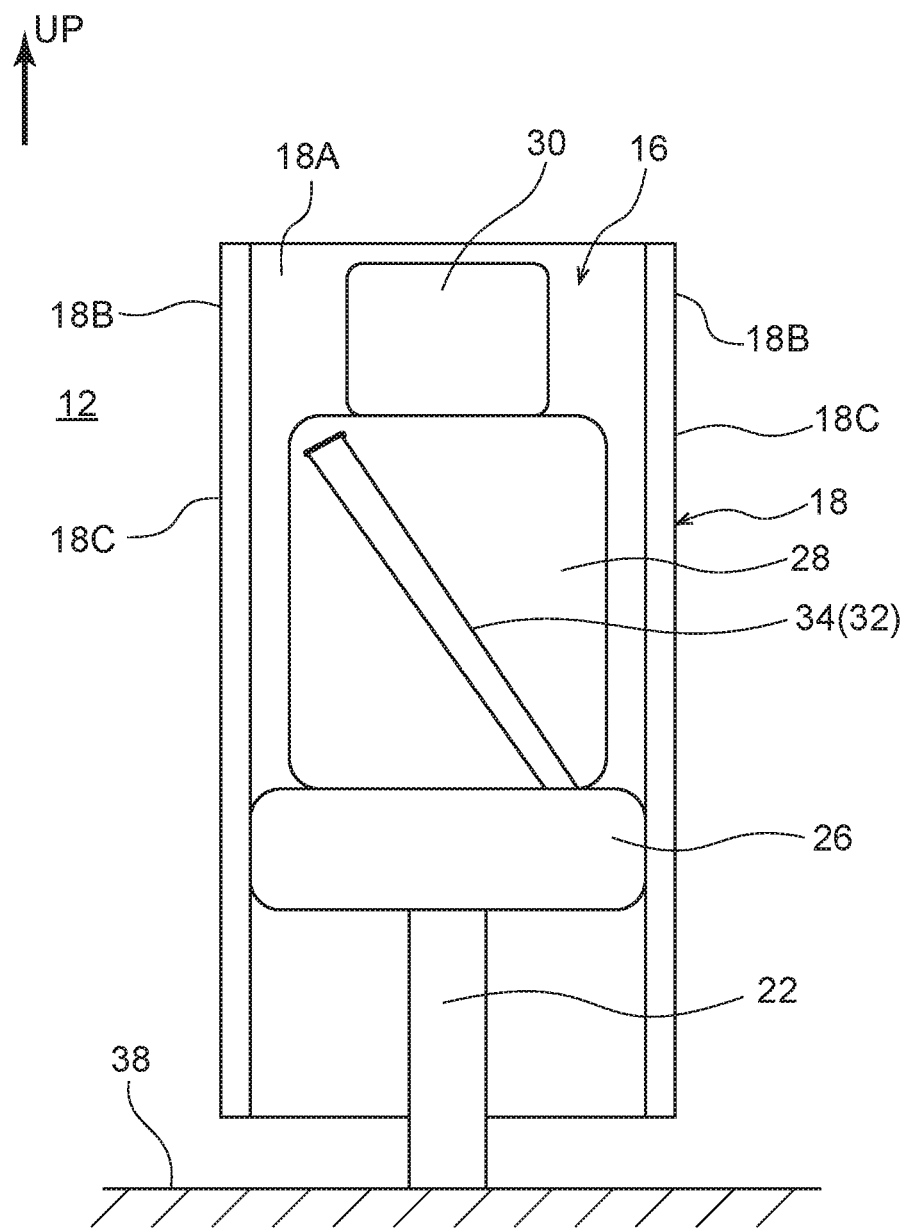
FIG. 3 is a face-on view illustrating a vehicle seat and a protective shell of the first exemplary embodiment.

Explanation follows regarding an occupant protection structure according to a first exemplary embodiment of the present disclosure, with reference to FIG. 1 to FIG. 3. Note that in the drawings, the arrow FR indicates a vehicle front-rear direction front side, the arrow UP indicates a vehicle vertical direction upper side, the arrow RH indicates a vehicle width direction right side, and the arrow LH indicates a vehicle width direction left side, as appropriate. In the following explanation, unless specifically stated otherwise, reference simply to front and rear, left and right, and upward and downward directions refers to the front and rear in the vehicle front-rear direction, the left and right in a vehicle left-right direction (the vehicle width direction), and upward and downward in the vehicle vertical direction.

FIG. 1 schematically illustrates a vehicle cabin 12 of a vehicle 10 applied with an occupant protection structure of the present exemplary embodiment. Note that the vehicle 10 of the present exemplary embodiment is a self-driving vehicle capable of traveling without an occupant to perform a driving operation. The vehicle 10 is therefore not provided with a steering wheel, pedals, or the like for an occupant to operate the vehicle.

A desk 14, serving as a usable table, four vehicle seats 16, and four protective shells 18, serving as shell sections surrounding the four respective vehicle seats 16, are provided in the vehicle cabin 12 of the vehicle 10.

The desk 14 is provided at a front-rear direction and a vehicle width direction central portion of the vehicle cabin 12. The desk 14 is configured including legs, not illustrated in the drawings, with lower end portions thereof fixed to a floor 38 of the vehicle cabin 12, and a tabletop 20 that is fixed to upper end portions of the legs. The tabletop 20 is formed in a rectangular shape that is long in the front-rear direction in plan view (as viewed from the upper side). An upper side face of the tabletop 20 configures a work surface 20A that is used by occupants operating personal computers or having discussions.

The four vehicle seats 16 are provided around the desk 14. As illustrated in FIG. 2 and FIG. 3, the vehicle seats 16 are each configured including a seat support column 22 serving as a seat support member, and a seat body 24 attached to an upper end portion of the seat support column 22.

As illustrated in FIG. 3, the seat body 24 includes a seat cushion 26 that supports buttocks of an occupant, a seatback 28 that is attached to a seat rear-side end portion of the seat cushion 26 and that supports a back of the occupant, and a headrest 30 that is attached to an upper end portion of the seatback 28 and that supports the head of the occupant. In the present exemplary embodiment, a seatbelt device 32 is provided to the seat body 24. A webbing 34 configuring part of the seatbelt device 32 is worn over the body of the occupant so as to suppress the occupant sitting in the vehicle seat 16 from moving toward the seat front side in a vehicle collision.

A rotation and locking mechanism is provided at the lower side of the seat body 24, as an example, provided at the seat support column 22 or between the seat support column 22 and a seat rail 36 (see FIG. 2). Providing the rotation and locking mechanism enables the seat body 24 to rotate about an axial direction running in the vertical direction, and also enables this rotation to be locked.

As illustrated in FIG. 1 and FIG. 2, the seat rail 36 is fixed to the floor 38 of the vehicle 10. The seat rail 36 is formed in a rectangular loop shape running around the periphery of the tabletop 20 of the desk 14 as viewed from the vehicle upper side. The lower end portion of the seat support column 22 of each of the four vehicle seats 16 is engaged with the seat rail 36. Note that a non-illustrated locking mechanism that locks movement of the seat support column 22 with respect to the seat rail 36 is provided between the lower end portion of the seat support column 22 and the seat rail 36. The four vehicle seats 16 can be moved to desired positions around the desk 14 by releasing the locking of movement of the seat support column 22 by the locking mechanism and moving the respective seat support columns 22 along the seat rail 36.

As illustrated in FIG. 2 and FIG. 3, each of the protective shells 18 is formed in a U-shape opening toward the seat front side so as to cover the corresponding vehicle seat 16 (the seat body 24 and the seat support column 22) from the seat rear side and the sides in the seat width direction as viewed from the upper side. Specifically, the protective shells 18 each include a rear-side facing portion 18A that is disposed at the rear side of the seatback 28 and the headrest 30 and that faces the seatback 28 and the headrest 30 in the seat front-rear direction. Each of the protective shells 18 further includes a left and right pair of side facing portions 18B that respectively extend from both end portions in the seat width direction of the seat rear-side facing portion 18A toward the seat front side. Portions 18C of the side facing portions 18B, which is located further toward the upper side than the seat cushion 26, face the occupant, sitting in the vehicle seat 16, in the seat width direction. The protective shell 18 described above is fixed to the corresponding seat body 24, and is thus capable of rotating together with the seat body 24 about an axial direction running in the vertical direction. In a fixed state of the protective shell 18 to the corresponding seat body 24, a lower end of the protective shell 18 does not contact the floor 38.

Operation and Advantageous Effects of the Present Exemplary Embodiment

Explanation follows regarding operation and advantageous effects of the present exemplary embodiment.

Figure 4:
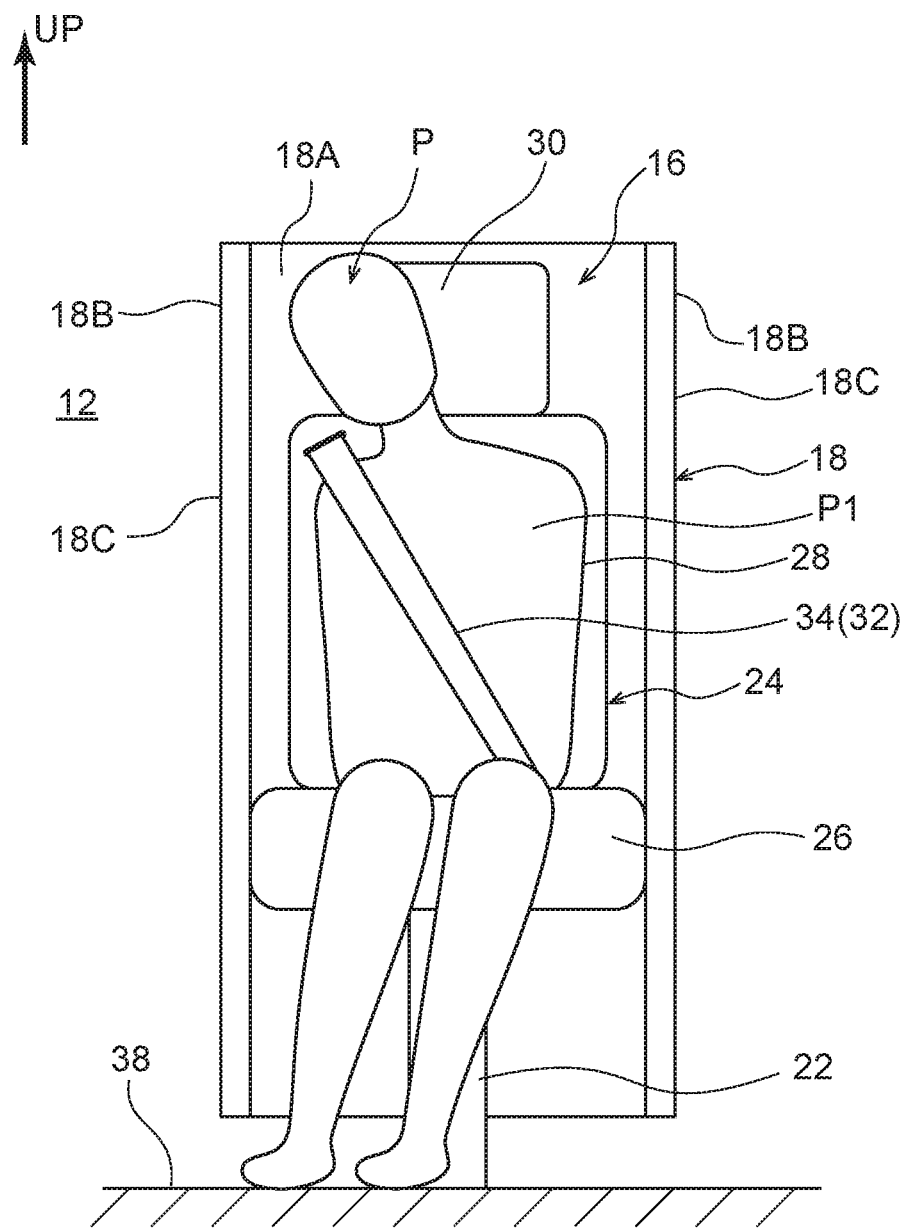
FIG. 4 is a face-on view corresponding to FIG. 3, illustrating an occupant, a vehicle seat, and a protective shell in a vehicle collision.

As illustrated in FIG. 1 and FIG. 4, an occupant P in the vehicle cabin 12 wears the webbing 34 of the seatbelt device 32 in a state in which the occupant P is sitting on one of the vehicle seats 16 such that the buttocks of the occupant P are supported by the seat cushion 26 and a back of the occupant P is supported by the seatback 28.

The seat body 24 of the vehicle seat 16 is rotated and the seat body 24 is then fixed at a position looking toward the desk 14, such that the occupant P is capable of performing a task on the tabletop 20 of the desk 14. As an example, the occupant P is able to operate a personal computer on the tabletop 20 in order to produce documents or the like.

In a case of a collision of the vehicle 10 of the present exemplary embodiment, depending on direction of the collision and the orientation of the vehicle seat 16, the occupant P sitting in the vehicle seat 16 might move sideways in the seat. In such cases, in the present exemplary embodiment, the upper body P1 of the occupant P moving sideways in the seat is restrained by the side facing portions 18B of the protective shell 18. The occupant P can thus be suppressed from coming into contact with members peripheral to the vehicle seat 16 (for example the desk 14 or an adjacent vehicle seat 16).

In the present exemplary embodiment, the seat rail 36 is provided at the floor 38 in a loop shape, enabling the vehicle seats 16 to be disposed at desired positions around the desk 14.

Second Exemplary Embodiment

Figure 5:
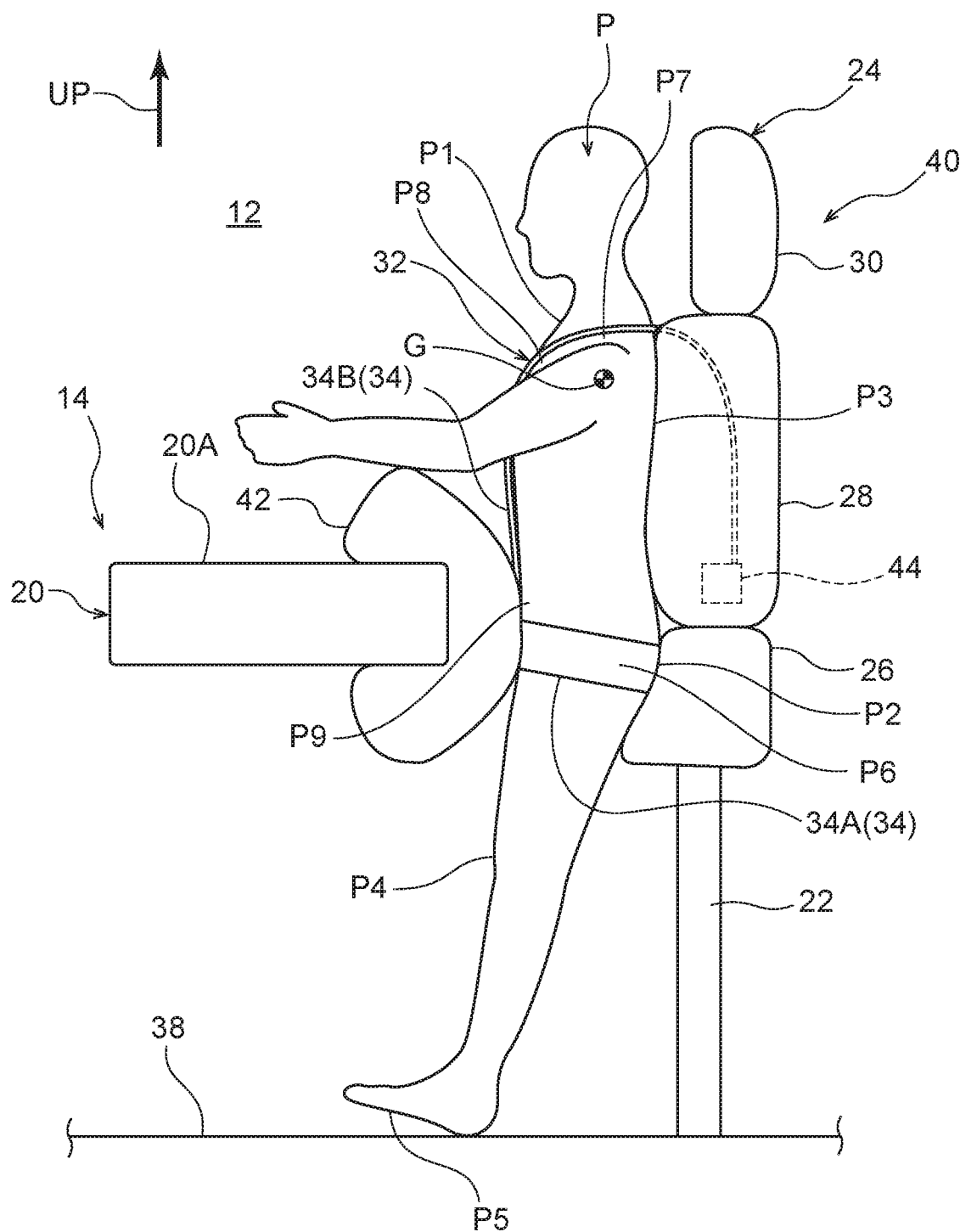
FIG. 5 is a side view illustrating an occupant protection structure of a second exemplary embodiment of the present disclosure.

Explanation follows regarding an occupant protection structure according to a second exemplary embodiment of the present disclosure, with reference to FIG. 5. Note that members and portions of the occupant protection structure according to the second exemplary embodiment that correspond to the occupant protection structure according to the first exemplary embodiment described above are allocated the same reference numerals as in the first exemplary embodiment, and explanation thereof may be omitted.

In the occupant protection structure according to the present exemplary embodiment, vehicle seats 40 adapted for an occupant P in an almost-standing posture are provided in the vehicle cabin 12, and an airbag 42 that inflates and deploys between the occupant P and the desk 14 is also provided.

In each of the vehicle seats 40 according to the present exemplary embodiment, a seat front-rear direction dimension of the seat cushion 26 is shorter than that of the seat cushions 26 of the vehicle seats 16 (see FIG. 2 and FIG. 3) of the first exemplary embodiment described above, and a height of the seat body 24 from the floor 38 is higher than in the vehicle seats 16 of the first exemplary embodiment. When the occupant P is in an almost-standing posture, buttocks P2 and a back P3 of the occupant P are supported by the seat cushion 26 and the seatback 28 respectively. Note that the almost-standing posture of the occupant is a state in which knees P4 is positioned at a lower side in the vertical direction than the buttocks P2, and the center of gravity G of an upper body P1 of the occupant P is positioned at a rear side in a seat front-rear direction of feet P5 that are in contact with the floor 38.

Note that configuration may be made in which the vehicle seat is not provided with the seat cushion 26 and the back P3 of the occupant P is supported by the seatback 28 when in a standing posture. In such cases, a standing posture is a state in which the knees P4 are not bent and the center of gravity G of the upper body P1 of the occupant P in the seat front-rear direction is located substantially at the same position as the feet P5 that are in contact with the floor 38.

The seatbelt device 32 of the present exemplary embodiment is what is referred to as a three-point seatbelt device. The seatbelt device 32 includes a webbing take-up device 44 provided inside the seatback 28, and the webbing 34 that the occupant P wears by pulling the webbing 34 out from the webbing take-up device 44. Note that a portion of the webbing 34 entrained across a waist P6 of the occupant P along the seat width direction is referred to as a lap webbing 34A, and a portion of the webbing 34 entrained diagonally with respect to the seat width direction from a shoulder P7 to a chest P8 of the occupant P is referred to as a shoulder webbing 34B. Moreover, the airbag 42 is fixed to the lap webbing 34A. Note that, prior to inflation, the airbag 42 is folded up to a dimension corresponding to the width of the lap webbing 34A. When the airbag 42 is in the folded state, the airbag 42 and part of the lap webbing 34A are covered by a non-illustrated cover member.

The webbing take-up device 44 is also provided with a pre-tensioner mechanism so as to pull in (take up) the webbing 34 into the webbing take-up device 44 in a vehicle collision.

Operation and Advantageous Effects of the Present Exemplary Embodiment

Explanation follows regarding operation and advantageous effects of the present exemplary embodiment.

As illustrated in FIG. 5, the occupant P wears the webbing 34 of the seatbelt device 32 in a state in which the occupant is supported by the vehicle seat 40 in an almost-standing posture.

The occupant P supported by the vehicle seat 40 is thus capable of performing tasks on the tabletop 20 of the desk 14 in an almost-standing posture. Note that the seat body 24 of the vehicle seat 40 may be rotated and the seat body 24 may be fixed at a position that does not look toward the desk 14.

In a case of a collision of the vehicle of the present exemplary embodiment, the pre-tensioner mechanism provided at the webbing take-up device 44 actuates to pull the webbing 34 into the webbing take-up device 44. The upper body P1 of the occupant P is thus restrained by the webbing 34, restricting movement of the upper body P1 with respect to the seatback 28. Note that in a vehicle collision the occupant P is more likely to fall toward the seat front side when in an almost-standing posture than when in a sitting posture. However, in the present exemplary embodiment, the upper body P1 of the occupant P is restrained by the webbing 34, enabling the occupant P to be suppressed from falling toward the seat front side.

In a vehicle collision, the airbag 42 provided to the lap webbing 34A inflates and deploys such that the airbag 42 is disposed between an abdomen P9 and the waist P6 of the occupant P on one side and the tabletop 20 of the desk 14 on the other side. The occupant P can thus be suppressed from contacting the tabletop 20 in a vehicle collision. Moreover, due to providing the airbag 42 at the webbing 34, the occupant P can be suppressed from contacting the tabletop 20 even if airbags do not inflate and deploy around the entire periphery of the tabletop 20.

Note that in the present exemplary embodiment described above, although explanation has been given regarding an example in which the pre-tensioner mechanism is provided at the webbing take-up device 44, a configuration without a pre-tensioner mechanism may be applied. Whether or not to provide a pre-tensioner mechanism may be decided in consideration of such factors as the posture of the occupant P when supported by the vehicle seat 40.

The configuration of the occupant protection structure of the first exemplary embodiment and the configuration of the occupant protection structure of the present exemplary embodiment may be combined with each other. Various configuration combinations enable an occupant sitting in the vehicle seat, an occupant supported by the vehicle seat in an almost-standing posture, or an occupant supported by the vehicle seat in a standing posture to be suppressed from coming into contact with members peripheral to the vehicle seat. Moreover, instead of the desk 14, a shelf or the like may be provided in the vehicle cabin as a usable table with a placement face on which luggage can be placed.

Explanation has been given regarding exemplary embodiments of the present disclosure. However, the present disclosure is not limited to the above, and obviously various other modifications may be implemented within a range not departing from the scope of the present disclosure.

What is claimed is:

1. A vehicle occupant protection structure comprising:
   a seat body including a seatback configured to support a back of an occupant; and
   a shell section including a portion configured to face a side of the occupant whose back is supported by the seatback and configured to restrict movement of the occupant in a seat width direction in a case of a vehicle collision, wherein
   the shell section is fixed to the seat body, and
   the shell section is formed in a U-shape opening toward a seat front side so as to cover the seat body from a rear side and from both sides in the seat width direction as viewed from an upper side of the seat body.

2. The vehicle occupant protection structure of claim 1, wherein a height of the seatback from a floor of a vehicle cabin is set such that the back of the occupant is supported by the seatback when the occupant is in a standing posture or in an almost-standing posture.

3. The vehicle occupant protection structure of claim 1, wherein the seat body is supported by the vehicle so as to be rotatable about an axial direction running in a vehicle vertical direction.

4. The vehicle occupant protection structure of claim 1, wherein:
   a seat rail formed in a loop shape as viewed from a vehicle upper side is provided at a floor of a vehicle cabin, and
   the seat body is supported by a seat support member configured to move along the seat rail.

5. The vehicle occupant protection structure of claim 1, wherein the seat body is supported by the vehicle so as to be rotatable about an axial direction running in a vehicle vertical direction, and the shell rotates with the seat body about the axial direction.

6. The vehicle occupant protection structure of claim 1, wherein a lower end of the shell in a vehicle up-down direction is spaced from a floor of a vehicle cabin in which the seat body and the shell are installed.

7. A vehicle occupant protection structure comprising:
   a table provided in a vehicle cabin and including a work surface enabling an occupant to perform a task or including a placement face on which luggage can be placed;
   a seat body provided peripherally to the table and including at least a seatback configured to support a back of an occupant; and
   an airbag provided between the occupant whose back is supported by the seatback and the table, the airbag being configured to inflate and deploy in a case of a vehicle collision, wherein
   the airbag inflates and deploys between the occupant and the table,
   the airbag is disposed at a lap webbing of a three-point seatbelt device that is configured to be worn by the occupant whose back is supported by the seatback, and
   a height of the seatback from a floor of the vehicle cabin is set such that the back of the occupant is supported by the seatback when the occupant is in a standing posture or in an almost-standing posture.

8. The vehicle occupant protection structure of claim 7, wherein:
   the webbing is pulled out from a webbing take-up device so as to be worn by the occupant, and
   the webbing is pulled into the webbing take-up device in the case of the vehicle collision such that a body of the occupant whose back is supported by the seatback is restrained by the webbing.

9. The vehicle occupant protection structure of claim 7, wherein the seat body is supported by the vehicle so as to be rotatable about an axial direction running in a vehicle vertical direction.

10. The vehicle occupant protection structure of claim 7, wherein:
    a seat rail formed in a loop shape as viewed from a vehicle upper side is provided at the floor of the vehicle cabin, and
    the seat body is supported by a seat support member configured to move along the seat rail.

* * * * *